April 17, 1928.                 1,666,194
C. P. BROCKWAY
AIR COOLED INTERNAL COMBUSTION ENGINE
Filed June 8, 1921        3 Sheets-Sheet 1
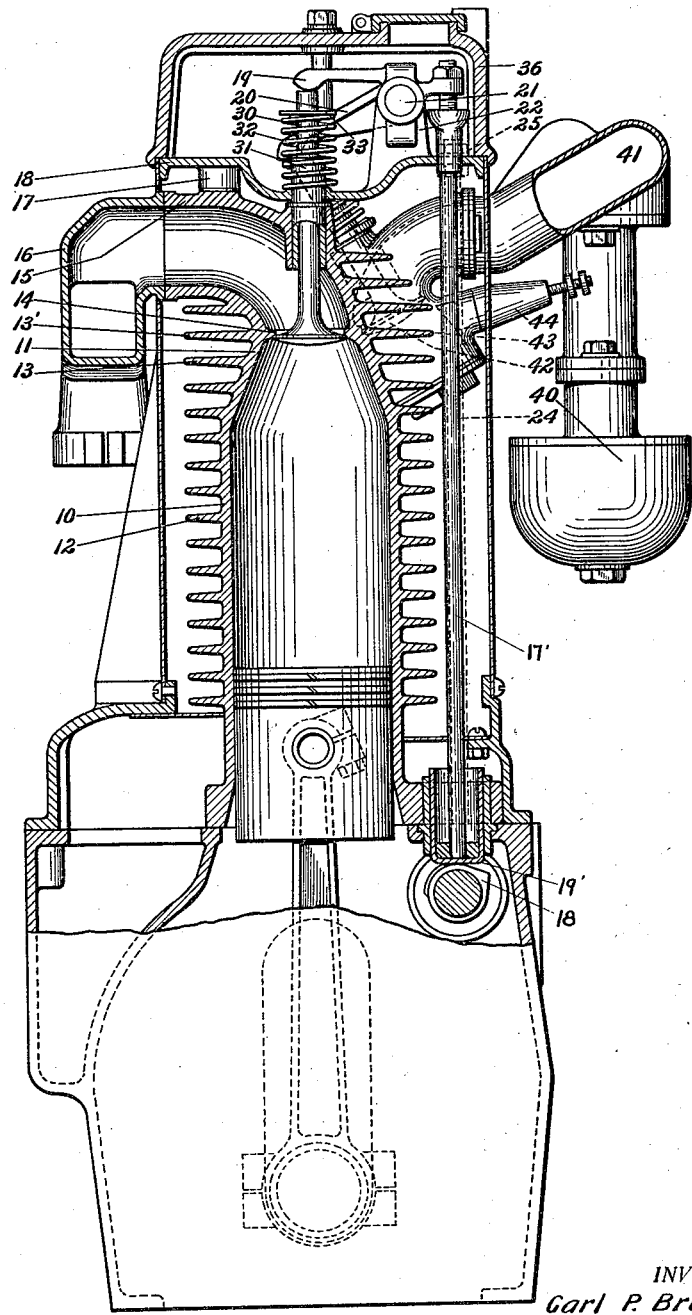
Fig. I.
INVENTOR.
Carl P. Brockway
BY Chester H Braselton
ATTORNEYS.

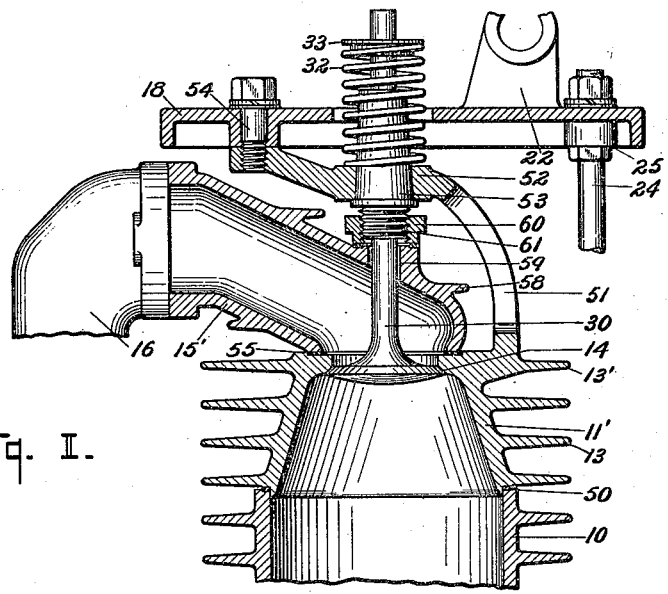
Fig. I.
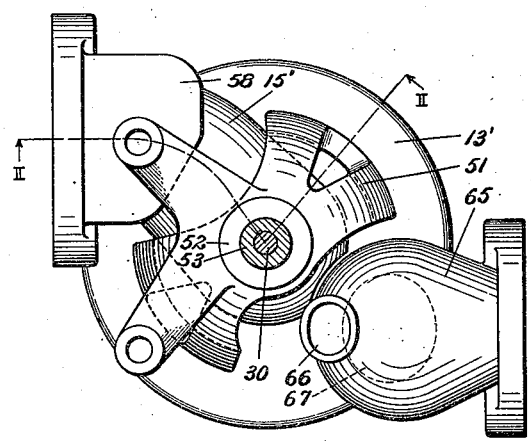
Fig. IA.
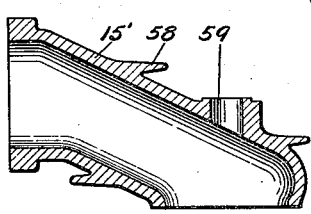
Fig. II.
INVENTOR.
Carl P. Brockway
BY Chester H Braselton
ATTORNEYS.

April 17, 1928. 1,666,194
C. P. BROCKWAY
AIR COOLED INTERNAL COMBUSTION ENGINE
Filed June 8, 1921 3 Sheets-Sheet 3
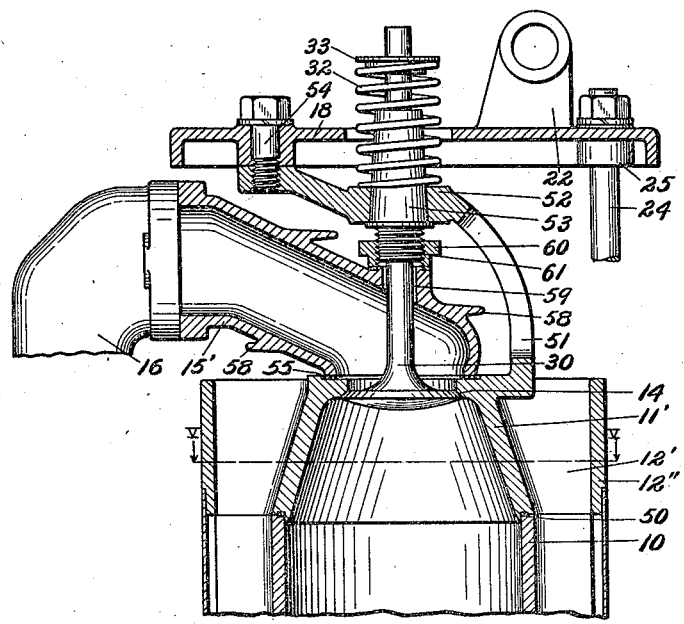
Fig. IV.
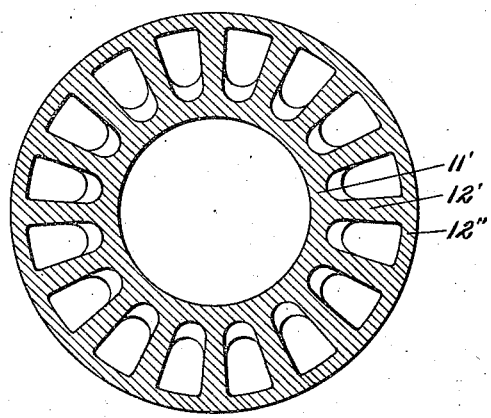
Fig. V.
INVENTOR.
Carl P. Brockway
BY Chester H Braselton
ATTORNEYS.

Patented Apr. 17, 1928.

1,666,194

UNITED STATES PATENT OFFICE.

CARL P. BROCKWAY, OF TOLEDO, OHIO, ASSIGNOR TO INDUSTRIAL RESEARCH CORPORATION, OF TOLEDO, OHIO, A CORPORATION OF DELAWARE.

AIR-COOLED INTERNAL-COMBUSTION ENGINE.

Application filed June 8, 1921. Serial No. 475,954.

The present invention relates to an improved construction of air cooled internal combustion engine and has for its object the provision of a structure which will permit uniform heat dissipation at the hotter portions of the engine to thereby prevent distortion or warping of the parts, particularly of the valve seats and valves, thereby greatly increasing the efficiency in operation and permitting successful air cooling with a minimum air supply. Thus the invention contemplates such an arrangement of exhaust valve and seat and such correlated construction of heat dissipating means as to uniformly and symmetrically dissipate the heat at the valve seat so as to maintain a uniform temperature and which permits expansion and contraction of parts without distortion or alteration of alignment of valve and valve seat.

A further important object of the invention is a novel arrangement for the heat dissipation of the exhaust valve seat and exhaust valve and correlated parts so as to particularly maintain uniform heat dissipation at the valve seat and alignment of parts at all times irrespective of variation in temperature, and subsequent expansion and contraction of the assembled parts and I have found that by the construction indicated, the radical improvement in cooling and in operation of an air cooled engine using a minimum of cooling medium is attained thereby.

A further object of the invention is to provide a construction of the character indicated by the arrangement which prevents movement of heat developed in auxiliary portions of an internal combustion engine to the engine proper, particularly adjacent the valve seats as is the case, for example, when bends occur in an exhaust pipe section. By my invention I so arrange and so heat insulate the exhaust as to prevent the action referred to, which I have discovered has a very detrimental effect on the successful cooling and causes warping or distortion of an engine of the type stated. Moreover, by the present invention the combustion chamber and exhaust valve seat are so designed as to obtain a balance in heat dissipation and uniform symmetrical heat dissipation including such shape of exhaust head as to provide a minimum internal surface to become heated for a maximum chamber with consequent maximum means for heat dissipation.

Further objects of the invention are to provide for correlated construction of heat conducting and heat radiating fins as to permit a maximum utilization of the material of the cylinders to effect a transfer of the heat to the cooling medium, such as air.

Further objects of the invention relate to the novel construction of air cooled overhead valve engine as to facilitate production, up-keep, and maintenance, including such arrangement of valve operating means as to properly operate irrespective of heat variations and longitudinal expansion and contraction of the engine head to a greater extent than the base thereof from which the means for operating overhead valves extend.

Other objects and those relating to simplicity of structure and economics of manufacture will appear herein as I proceed with a detailed description of that particular embodiment of my invention which for the purposes of illustration I have shown in the accompanying drawings, in which Figure I is a sectional view of one embodiment of my invention showing an exhaust valve centrally located in the cylinder head with the symmetrical heat dissipating means adjacent thereto.

Figure II is a similar view taken substantially on the line II—II of Figure II$^A$ showing a further embodiment of my invention with the important addition of means for maintaining the proper alignment of the valve and the dissipation of heat thereof independently of the exhaust.

Figure II$^a$ is a top plan view of a portion thereof.

Figure III is a sectional view of the exhaust pipe when detached from the engine assembly.

Figure IV is a view similar to Figure II of a modified embodiment of the invention disclosed in Figure II.

Figure V is a cross sectional view on the line V—V of Figure IV.

Referring to the drawings, in Figure I the embodiment of my invention includes a cylinder 10 having, in this case, an integral end head 11, dome shaped as shown, to provide a maximum volume at the head for minimum exposed inside surface which may become heated consistent with the employment of heat dissipating means used therewith. For the purpose of illustration I have shown a plurality of circumferential radially extended heat dissipating fins 12 for said cylinder 10 and a plurality of generally similar fins 13 for the end 11 thereof.

The exhaust valve seat 14 is located centrally in the end of said end head 11 and it will be noted that a heat dissipating fin 13' extends directly outwardly from the material forming the valve seat proper. The exhaust pipe section 15 extends upwardly and laterally from said valve seat to be connected to the exhaust pipe 16 as will be understood by those skilled in the art. The exhaust section 15 has a plurality of upwardly extending lugs 17 adapted to form a support for a plate 18 which forms a support for the overhead valve, operating rocker arms shown at 19 and 20. These rocker arms may be pivoted on a shaft 21 which is carried by supports 22 also located on the head plate 18. Means to bind and support the head plate 18 from the engine base is shown in a rod 24 fixed to the plate 18 at 25 and extending downwardly to the engine crank case, thus securing the head plate 18 in proper assembled position connecting the same to the engine base or crank case as may be desired. A valve stem is shown operatively connected to valve cam 18' through the bearing cap 19'.

The exhaust valve 30 is guided through the guide 31 which is carried in the exhaust pipe section 15. The valve spring 32 is located between the ring 33 on the valve stem and the upper side of the head plate 18. It will be seen that by this arrangement the valve assembly and valve operating mechanism is particularly accessible. The end cover 36 may be carried on the plate 18 to cover the valve stem, valve spring, and valve operating rocker arms.

The carburetor is shown at 40 connected with the intake 41 which leads to the intake valve 42. The intake chamber 43 on which is formed the intake valve seat is also designed to receive a spark plug 44 as shown, with the attendant advantage of so locating the spark plug as to be cooled and cleaned by the incoming explosive mixture.

In the embodiment of my invention shown in Figure II several important advantages are incorporated therein as it will be seen that the engine head 11' is supported from the engine cylinder 10 being heat insulated therefrom by gasket 50. The valve seat 14 has the opposed heat dissipating fin 13' as before but I have provided means for guiding the valve 30 independently of any exhaust pipe section for the engine. A suitable construction for attaining this end is found in an upwardly extending open cage 51 cast integral with the engine head 11'. This cage is dome shaped terminating in a central hub 52 which is adapted to receive valve stem guide 53. This cage 52 may be used to support the plate 18 by lugs 54, the plate 18 carrying the supports 22 for the rocker arm pivoted as in the embodiment shown in Figure I.

The efficiency of my improved engine construction with the central location of the exhaust valve and valve seat is materially increased by utilizing a separate exhaust pipe 15' heat insulated from the cylinder head 11' by a gasket 55. It will be noticed that this tends to prevent any heat from the exhaust pipe section 15' from returning to the cylinder head 11' should the same become heated to a higher temperature by reason, for example, of a sharp bend therein or a bend in the juncture of this exhaust section 15' and exhaust pipe 16. It will be noted that 15' is inserted between the top of the valve guide cage 51 and the top of the engine head 11'.

A valve section 15' is shown detached in Figure III. It will be seen that by the arrangement disclosed, suitable heat dissipating fins 58 may be cast integral with the exhaust pipe section 15'. The same is provided with the opening 59 through which the valve stem 30 passes, said opening being of sufficient size as to prevent any contact at any time between the valve stem 30 and the exhaust pipe section 15'. The exhaust pipe section 15' is clamped in position by a nut 60 screw threaded on the depending screw 61 of the valve stem guide 53 carried by the cage 51. The guide therefore performs the double function of guiding the valve and forming means whereby the exhaust pipe section 15' may be properly aligned and clamped in operative position.

In addition to so locating the exhaust valve 30 as to form equal heat dissipation therefrom and locating the same in the end head, although other places might be devised, it will be seen that contraction and expansion will not distort or warp the valve seat and that guiding the valve stem in the cage 51 integrally or otherwise connected with the cylinder head 11', but separate and distinct from the exhaust section 15', operates to maintain proper alignment of the valve and valve seat because of a more uniform heating and a greater dissipation which is obtained by the arrangement disclosed, there being no heating agent coming in contact with the valve guide cage 51 as compared with the exhaust pipe section 15' which becomes extremely hot. A correlation of these two phases has produced extremely advantageous results. Moreover, the gasket 55 tends to prevent any return of heat from the exhaust pipe 15', and in addition thereto, tends to force the heat out the exhaust valve seat 14, down the cylinder head 11' to be disposed of by the radiating fins 13. It will be noted that the intake pipe 65 may be cast integral with the head 11' and has the intake valve stem guide 66 integral therewith. An opening 67 is provided with screw threads to obtain access to the intake valve seat.

In the embodiment of the invention illustrated in Figure IV I have used with the construction illustrated in Figure II, an improved type of heat radiating fin which, instead of extending laterally, is arranged longitudinally of the cylinder and as shown in cross section in Figure V gradually increases outwardly from the cylinder, and the plurality of fins are so spaced and designed as to provide for a free circulation of a cooling medium and at the same time there is such a relation between the conductivity of the fins 12' to the radiation thereof as to rapidly conduct heat away from the cylinder and engine head and dissipate the same to the cooling air. This action may be further enhanced by the employment of an external connecting ring 12'' which, in addition, provides an entirely enclosed separate air passage longitudinally of the cylinder head and valve stem guide cage.

The operation of the improved air cooled internal combustion engine constituting the present invention will be understood from the foregoing. It will be seen that in Figure I and in the other figures the central location of the exhaust valve, the valve seat, and the symmetrical heat dissipating means therefor provides a structure which will prevent distortion upon expansion and contraction of the cylinder as a whole and will uniformly dissipate the heat throughout the entire circumference of the valve seat to therefore maintain an equal passage of exhaust gases around the seat and valve when open, thereby entirely preventing localized heat and consequent warping of valve seat by passage of a greater amount of exhaust gas at one portion thereof than at another. It will be further noted that the rocker arm carrying mechanism in the top plate 18 being connected through the support 17 to the engine cylinder or head and connected through the rod 24 at 25 to the base of the engine, as the engine cylinder expands the plate rocks about the point 25 as a pivot. This tends to maintain the proper space of rocker arms 19 and 20 relative to the exhaust valve 30 and intake valve as well as between the rocker arms and the push rods.

The efficient action of the construction illustrated in Figures II and IV will also be understood from the description thereof and it will be seen that the novel arrangement has unusual advantages in proper alignment, preventing of warping and equal heat dissipation as heretofore indicated. In this way a maximum cooling effect with a minimum amount of air and an extremely efficient operating air cooled internal combustion engine is obtained.

I claim—

1. An air cooled engine including a cylinder and a cylinder head having a central exhaust valve seat, heat conducting and radiating means immediately adjacent thereto arranged to cool said seat, an exhaust pipe section connected to said head immediately surrounding said valve seat, a heat insulated gasket at said connection and a valve stem guide supported from said head independently of said exhaust pipe.

2. An air cooled engine including a cylinder provided with heat insulating fins, a separate head secured thereto having a heat insulating gasket therebetween, said head having heat radiating fins therefor, an exhaust valve seat located centrally of said head, a valve stem support integral with said head, means whereby a cooling medium may cool said support, a separate exhaust outlet pipe section joined with said head at said seat and a heat insulating means between said section and said head.

3. In an engine construction, the combination of an explosion chamber having an exhaust valve formed therein for the removal of heated exhaust gases; a conduit for the removal of said gases in connection with said valve; insulating means between the conduit and valve; a stem connected to said valve; and means for supporting said stem, said means including a bracket mounted on said engine but displaced from the exhaust heated portions of the chamber and exhaust valve.

4. In an engine construction, the combination of an explosion chamber having an exhaust valve formed therein for the removal of heated exhaust gases; a conduit for the removal of said gases in connection with said valve; insulating means between the conduit and valve; a stem connected to said valve; means for supporting said stem, said means including a bracket mounted on said engine but displaced from the exhaust heated portions of the chamber and exhaust valve; and means including an annular heat radiating fin integral with said chamber for uniformly conducting heat away from the valve.

In testimony whereof I affix my signature.

CARL P. BROCKWAY.